(12) United States Patent
Yang et al.

(10) Patent No.: US 11,019,188 B2
(45) Date of Patent: May 25, 2021

(54) POP-OUT CAMERA MODULE AND TERMINAL

(71) Applicant: Beijing Xiaomi Mobile Software Co., Ltd., Beijing (CN)

(72) Inventors: Jieming Yang, Beijing (CN); Hongzhi Jin, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/742,438

(22) Filed: Jan. 14, 2020

(65) Prior Publication Data

US 2020/0351395 A1 Nov. 5, 2020

(30) Foreign Application Priority Data

Apr. 30, 2019 (CN) .......................... 201910363554.0

(51) Int. Cl.
*H04M 1/02* (2006.01)
*G03B 17/04* (2021.01)
*H04N 5/225* (2006.01)
*H04N 5/232* (2006.01)
*H04B 1/3827* (2015.01)

(52) U.S. Cl.
CPC .......... *H04M 1/0264* (2013.01); *G03B 17/04* (2013.01); *H04N 5/2252* (2013.01); *H04N 5/2257* (2013.01); *H04N 5/23241* (2013.01); *H04B 1/3827* (2013.01); *H04M 2250/52* (2013.01)

(58) Field of Classification Search
None
See application file for complete search history.

(56) References Cited

U.S. PATENT DOCUMENTS

| | | | | |
|---|---|---|---|---|
| 8,638,510 B2 * | 1/2014 | Lee | ........................... | H02K 5/04 359/824 |
| 2007/0097218 A1 * | 5/2007 | Chen | .................... | H04N 5/2253 348/208.7 |
| 2007/0110424 A1 * | 5/2007 | Iijima | .................... | G02B 7/026 396/133 |

(Continued)

FOREIGN PATENT DOCUMENTS

| CN | 101527490 A | 9/2009 |
|---|---|---|
| CN | 204408431 U | 6/2015 |

(Continued)

OTHER PUBLICATIONS

Office Action of Korean Application No. 10-2019-7028217 dated Nov. 24, 2020.

(Continued)

*Primary Examiner* — William B Perkey
(74) *Attorney, Agent, or Firm* — Finnegan, Henderson, Farabow, Garrett & Dunner, L.L.P.

(57) ABSTRACT

A pop-out camera module includes: a module housing, a camera housing, a plurality of coils, a first magnet and a second magnet, wherein a pop-out hole of the camera housing is formed on the module housing, and a camera is disposed inside the upper part of the camera housing; the plurality of coils are disposed in parallel and axially surround an outer wall below the camera housing; and the first magnet and the second magnet are disposed in the module housing, and the plurality of coils are located between the first magnet and the second magnet.

18 Claims, 11 Drawing Sheets

(56) References Cited

U.S. PATENT DOCUMENTS

| | | | |
|---|---|---|---|
| 2007/0166022 A1* | 7/2007 | Lai | G03B 3/10 |
| | | | 396/133 |
| 2011/0281618 A1 | 11/2011 | Chambers et al. | |
| 2014/0211078 A1* | 7/2014 | Watanabe | H04N 5/23296 |
| | | | 348/351 |
| 2017/0237884 A1 | 8/2017 | Evans et al. | |
| 2018/0262663 A1* | 9/2018 | Zhang | H04M 1/0264 |
| 2019/0138062 A1* | 5/2019 | Zeng | H04M 1/0237 |
| 2020/0020471 A1* | 1/2020 | Luo | H01F 7/121 |
| 2020/0374433 A1* | 11/2020 | Zhang | H04N 5/225 |
| 2020/0396358 A1* | 12/2020 | Park | G03B 17/14 |

FOREIGN PATENT DOCUMENTS

| | | |
|---|---|---|
| CN | 205510137 U | 8/2016 |
| CN | 207118136 U | 3/2018 |
| CN | 207354463 U | 5/2018 |
| CN | 108111729 A | 6/2018 |
| CN | 108834354 A | 11/2018 |
| CN | 108965508 A | 12/2018 |
| CN | 208445590 U | 1/2019 |
| CN | 109379468 A | 2/2019 |
| CN | 208580354 A | 3/2019 |
| CN | 208797996 U | 4/2019 |
| EP | 3 197 134 A1 | 7/2017 |
| EP | 3 594 777 A1 | 1/2020 |
| KR | 20050020313 A | 3/2005 |
| KR | 20060016037 A | 2/2006 |
| KR | 200414536 Y1 | 4/2006 |
| KR | 100819814 B1 | 4/2008 |
| KR | 20190069559 A | 6/2019 |
| RU | 2496128 C2 | 10/2013 |
| RU | 2642546 C2 | 1/2018 |
| WO | WO 2015/122740 A1 | 8/2015 |

OTHER PUBLICATIONS

English version of International Search Report in Application No. PCT/CN2019/098198, from the China National Intellectual Property Administration (ISA/CN), dated Jan. 6, 2020.

International Search Report of PCT Application No. PCT/CN2019/098198 from CNIPA, dated Jan. 6, 2020.

Office Action of Russian Application No. 2019141613/07 dated Jun. 22, 2020.

Extended European Search Report in European Application No. 20150737.3, dated Jul. 14, 2020.

* cited by examiner

POP-OUT CAMERA MODULE AND TERMINAL

CROSS-REFERENCE TO RELATED APPLICATIONS

The present application is based on and claims priority to Chinese Patent Application No. 201910363554.0, filed on Apr. 30, 2019, the entire contents of which are hereby incorporated by reference.

TECHNICAL FIELD

The present disclosure relates to terminal technologies, in particular to a pop-out camera module and a terminal.

BACKGROUND

The front camera on a terminal provides rich functions, such as, a photographing function, a video taking function, a game entertainment function, an unlocking and payment function, etc. As the screen occupancy ratio on a terminal (e.g., a full screen mobile phone) becomes increasingly high, the space occupied by the front camera on the front panel of the terminal is continuously reduced.

In the related art, the terminal may use a pop-out camera module realized by mechanical devices such as a motor, a gear set, a lead screw, etc., and the pop-out camera module may have a complicated structure and occupy a large space.

SUMMARY

According to a first aspect of embodiments of the present disclosure, a pop-out camera module is provided. The pop-out camera module includes: a module housing, a camera housing, a plurality of coils, a first magnet and a second magnet, wherein a pop-out hole of the camera housing is formed on the module housing, and a camera is disposed inside an upper part of the camera housing; the plurality of coils are disposed in parallel and axially surround an outer wall below the camera housing; and the first magnet and the second magnet are disposed in the module housing, and the plurality of coils are located between the first magnet and the second magnet.

According to a second aspect of embodiments of the present disclosure, a terminal is provided, including a body housing, the pop-out camera module according to the first aspect, and a current control component corresponding to the pop-out camera module; wherein the current control component is coupled with the plurality of coils of the pop-out camera module through a power supply circuit.

The technical solutions provided by the embodiments of the present disclosure have the following beneficial effects.

In the embodiments of the present disclosure, the pop-out and pop-back of the pop-out camera module are realized through the interaction between the coils and the magnets after the coils are energized. As compared with the related art in which the pop-out and pop-back are realized through mechanical devices such as a motor, a gear set, a lead screw, etc., structure complexity of the pop-out camera module is reduced, and occupied space of the pop-out camera module is saved.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Figure 1:
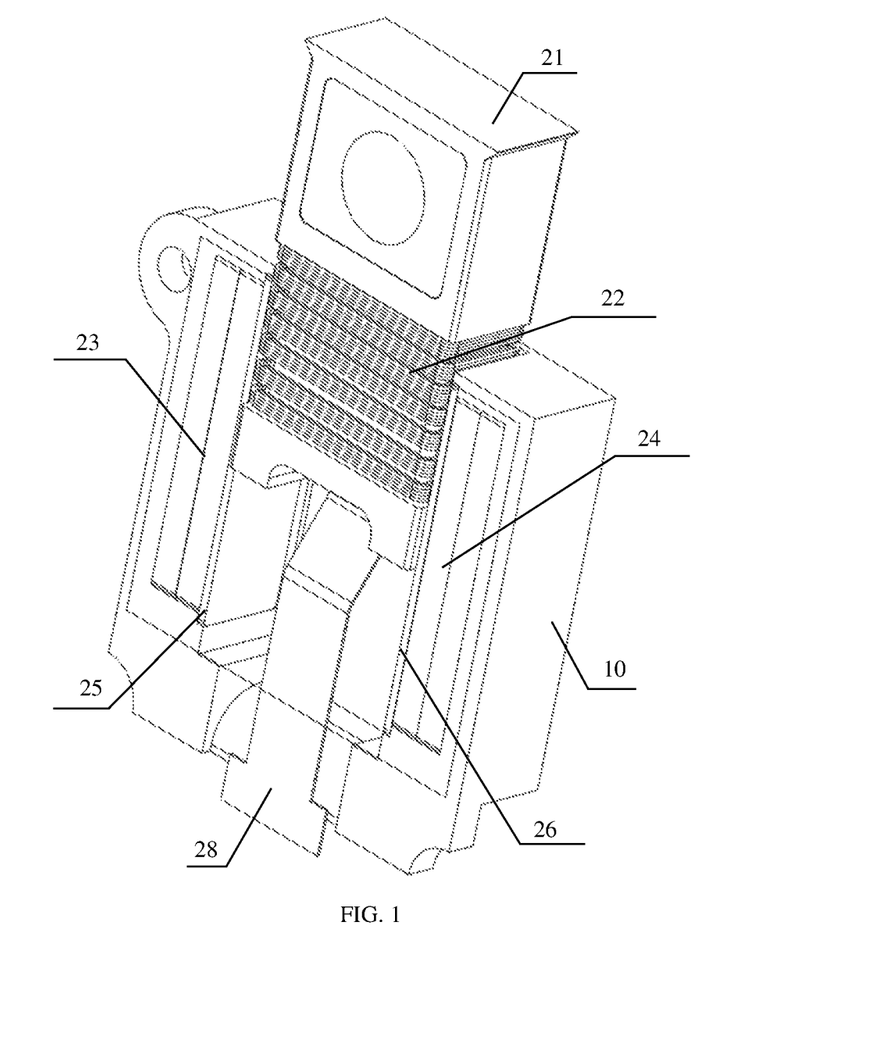
FIG. 1 is a schematic diagram of a pop-out camera module according to an exemplary embodiment.

FIG. 1 is a schematic diagram of a pop-out camera module according to an exemplary embodiment of the present disclosure. The pop-out camera module includes a module housing 10, a camera housing 21, n coils 22, a first magnet 23 and a second magnet 24, where n is an integer larger than 1.

The camera may be a front camera or a rear camera of a terminal, and embodiments of the present disclosure do not impose specific limitations on this. When the camera is needed to be used, the camera housing 21 in the pop-out camera module is in a pop-out state and exposed outside the terminal; when the camera is not needed to be used, the camera housing 21 of the pop-out camera module is in a pop-back state and hidden inside the terminal.

In embodiments of the present disclosure, a type of the camera is not limited. For example, the camera may be an analog camera or a digital camera. When the camera is an analog camera, the camera may provide relatively high resolution.

It should be noted that the pop-out camera module may include one or more cameras, and each camera may realize the same function or may realize different functions, and embodiments of the present disclosure do not impose specific limitations on this.

A pop-out hole for the camera housing 21 is provided on the module housing 10, and a camera (not shown in the figure) is disposed inside the upper portion of the camera housing 21. When the camera housing 21 passes through the pop-out hole and is exposed outside the terminal, the camera in the camera housing 21 can take photographs or videos.

In some embodiments, the module housing 10 may be a cubic shape.

In some embodiments, a lens is further disposed on a surface of the camera housing 21 opposite to the lens of the camera, so as to protect the camera.

In the embodiments of the present disclosure, the module housing 10 is fixed in the terminal to support the whole pop-out camera module, and the pop-out camera module is separated from other parts inside the terminal, so as to further realize the functions of sealing, dust-proofing, water-proofing, etc.

The n coils 22 are disposed in parallel and axially surround the outer wall below the camera housing 21. The n coils 22 form a coil array. In some embodiments, the arrangement direction of the n coils 22 coincides with the pop-out and pop-back direction of the camera housing 21.

The first magnet 23 and the second magnet 24 are disposed in the module housing 10, and the n coils 22 are located between the first magnet 23 and the second magnet 24.

In one embodiment, the first magnet 23 and the second magnet 24 may be permanent magnets; and in another embodiment, the first magnet 23 and the second magnet 24 may also be electromagnets. The embodiments of the present disclosure are not limited thereto.

Figure 2:
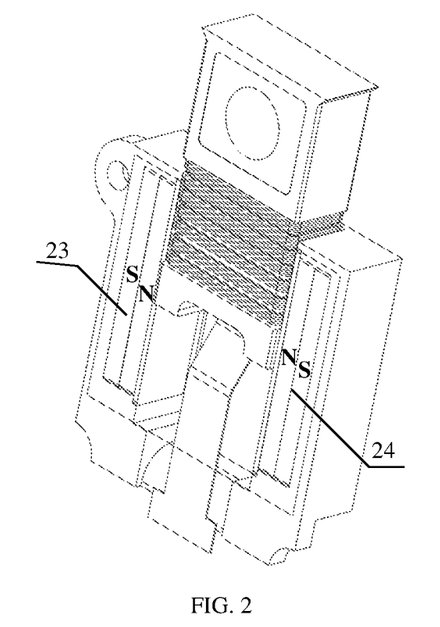
FIG. 2 is a schematic diagram of a first magnet and a second magnet in opposite polarities according to an exemplary embodiment.
Figure 3:
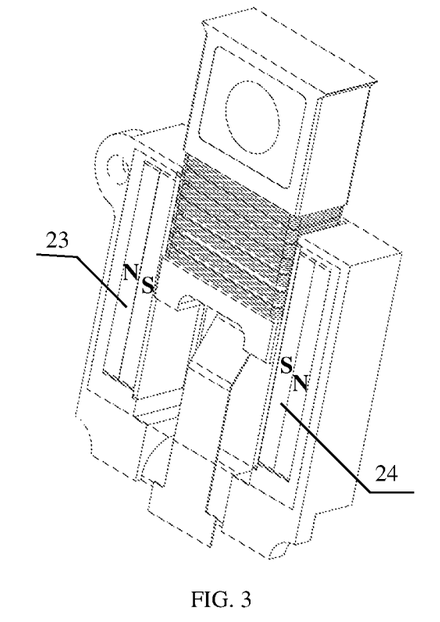
FIG. 3 is a schematic diagram of a first magnet and a second magnet in opposite polarities according to an exemplary embodiment.

In some embodiments, polarities of the first magnet 23 and the second magnet 24 are mirrored, that is, the polarity of the end of the first magnet 23 close to the camera housing 21 is the same as the polarity of the end of the second magnet 24 close to the camera housing 21. For example, referring to FIG. 2, the end of the first magnet 23 close to the camera housing 21 is an N pole, and the end of the second magnet 24 close to the camera housing 21 is also an N pole. For another example, referring to FIG. 3, the end of the first magnet 23 close to the camera housing 21 is S pole, and the end of the second magnet 24 close to the camera housing 21 is also S pole.

During the pop-out of the camera housing 21, the n coils 22 generate a first electromagnetic field combination to push the camera housing 21 to pop-out from the module housing 10 under driving of the first magnet 23 and the second magnet 24.

When electricity enters into the coils, an electromagnetic field can be generated, and the electromagnetic field can attract or repel the magnetic field of the magnets. When the electromagnetic field of the coils and the magnetic field of the magnets attract each other, the coils and the magnets tend to approach each other; and on the contrary, when the electromagnetic field of the coils and the magnetic field of the magnets repel each other, the coils and the magnets tend to be away from each other. In the embodiments of the present disclosure, since the magnets are disposed in the module housing 10 while the module housing 10 is fixed in the terminal, the magnets cannot move and the coils move to approach or go away from the magnets.

In some embodiments, the n coils include a first coil group and a second coil group. The first coil group includes at least one coil close to the pop-out hole on the module housing 10, and the second coil group includes at least one coil away from the pop-out hole on the module housing 10.

During the pop-out or the pop-back, the first coil group and the second coil group generate electromagnetic fields with opposite magnetism, respectively, so as to drive the camera housing to pop-out or pop-back.

During the pop-out of the camera housing 21, the first electromagnetic field combination includes a first electromagnetic field generated by the first coil group and a second electromagnetic field generated by the second coil group. The first electromagnetic field is an electromagnetic field that attracts the first magnet 23 and the second magnet 24, and the second electromagnetic field is an electromagnetic field that repels the first magnet 23 and the second magnet 24.

When the first electromagnetic field is an electromagnetic field that attracts the first magnet 23 and the second magnet 24, the first magnet 23 and the second magnet 24 have an attractive force to the first coil group, thereby pulling the first coil group to move toward the pop-out hole on the module housing 10. When the second electromagnetic field is an electromagnetic field that repels the first magnet 23 and the second magnet 24, the first magnet 23 and the second magnet 24 have a repulsive force against the second coil group, thereby pushing the second coil group to move in a direction approaching the pop-out hole on the module housing 10. Thus, the n coils 22 are driven by the first magnet 23 and the second magnet 24 to push the camera housing 21 to pop-out out of the module housing 10.

During the pop-back of the camera housing 21, the n coils 22 generate a second electromagnetic field combination, and the camera housing 21 pop-backs into the module housing under the driving of the first magnet 23 and the second magnet 24.

During the pop-back of the camera housing 21, the second electromagnetic field combination comprises a third electromagnetic field generated by the first coil group and a fourth electromagnetic field generated by the second coil group. The third electromagnetic field is an electromagnetic field that repels the first magnet 23 and the second magnet 24, and the fourth electromagnetic field is an electromagnetic field that attracts the first magnet 23 and the second magnet 24.

When the third electromagnetic field is an electromagnetic field that repels the first magnet 23 and the second magnet 24, the first magnet 23 and the second magnet 24 have a repulsive force against the first coil group, thereby pushing the first coil group to move away from the pop-out hole on the module housing 10. When the fourth electromagnetic field is an electromagnetic field that attracts the first magnet 23 and the second magnet 24, the first magnet 23 and the second magnet 24 attract the second coil group, thereby pulling the second coil group to move away from the pop-out hole in the module housing 10. Thus, the n coils 22 are driven by the first magnet 23 and the second magnet 24 to pull the camera housing 21 to pop-back into the module housing 10.

Figure 4:
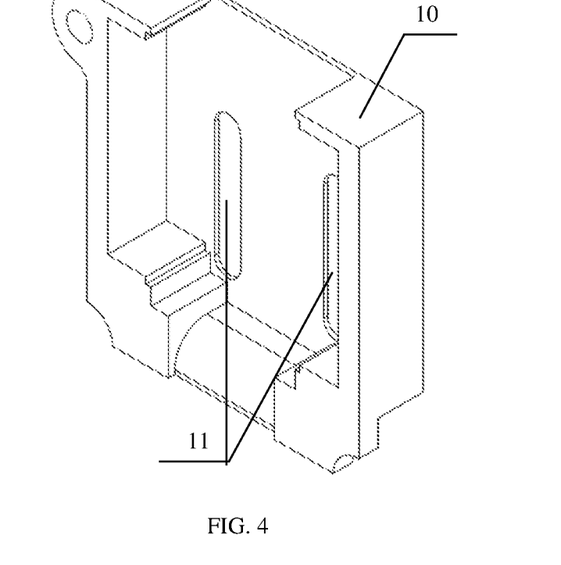
FIG. 4 is a schematic diagram of a limit slot on a module housing according to an exemplary embodiment.
Figure 5:
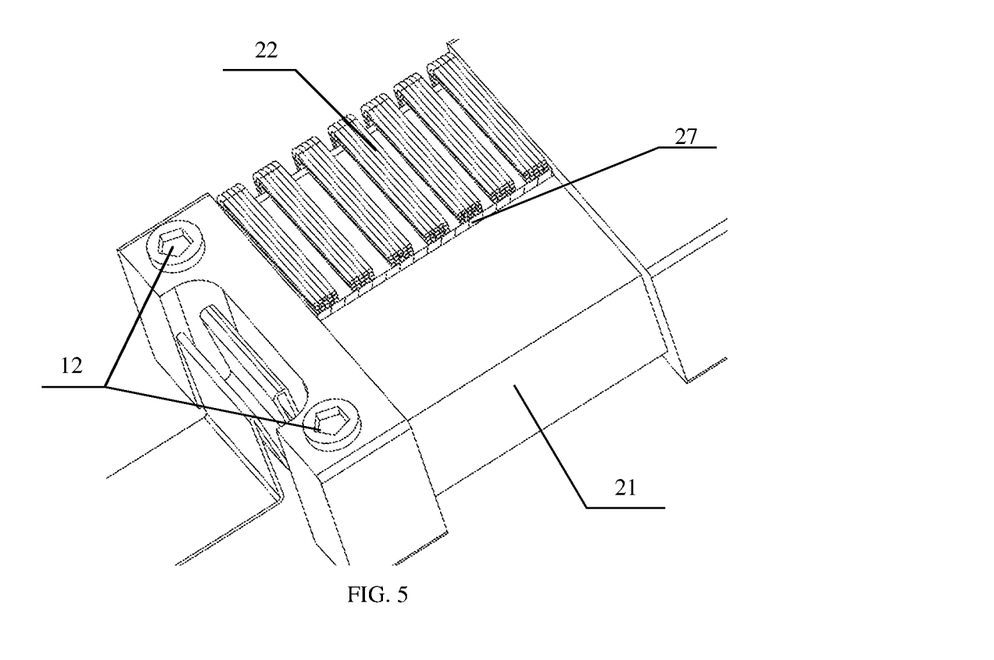
FIG. 5 is a schematic diagram of a limit portion on a camera housing according to an exemplary embodiment.

Referring to FIG. 4, a limit slot 11 is formed on the module housing 10. Referring to FIG. 5, a limit portion 12 matching the limit slot 11 is disposed on the camera housing 21. During the pop-out or the pop-back, the limit portion 12 of the camera housing 21 slides in the limit slot 11.

The limit slot 11 is formed on the inner wall of the module housing 10, and may be a rectangular slot, a U slot, a T slot or the like, which is not limited in the embodiments of the present disclosure.

The limit portion 12 is located on the side of the camera housing 21 away from the pop-out hole of the module housing 10. In an exemplary embodiment, the limit portion 12 may be a limit screw or a limit bolt disposed on the camera housing 21, and the limit screw or the limit bolt may be adapted to the limit slot 11. In another exemplary embodiment, the limit portion 12 may be a protuberance integrally formed on the camera. housing 21, and the protuberance may be adapted to the limit slot 11.

In addition, in the embodiments of the present disclosure, the number of the limit slots 11 is not limited, and there may be one or more limit slots; correspondingly, there may be one or more limit portions 12.

In the embodiments of the present disclosure, the limit slot is adapted to the limit portion. On the one hand, the limit portion can slide in the limit slot during the pop-out or pop-back of the camera housing; on the other hand, due to the limitation of the length of the limit slot, the maximum displacement of the camera housing is limited, and the camera housing is prevented from being detached from the module housing.

Referring back to FIG. 1, the pop-out camera module may further include a first baffle 25 and a second baffle 26. The first baffle 25 is disposed between the first magnet 23 and the camera housing 21. The second baffle 26 is disposed between the second magnet 24 and the camera housing 21.

The first baffle 25 and the second baffle 26 are symmetrically disposed on two sides of the interior of the module housing 10. The first baffle 25 is disposed between the first magnet 23 and the camera housing 21 to separate the first magnet 23 from the camera housing 21. The second baffle 26 is disposed between the second magnet 24 and the camera housing 21 to separate the second magnet 24 from the camera housing 21.

In embodiments of the present disclosure, the magnets and the camera housing are separated by the baffles. When the camera module is popped out, the camera module moves along the baffles, and the baffles operate similar to slide rails. On the one hand, the damage to the magnets caused by friction generated during the pop-out and pop-back of the camera housing can be avoided, and on the other hand, good lubricity is provided for the pop-out and pop-back of the camera housing.

FIG. 5 shows a schematic view of the coils cut along a cross-section of the coils according to exemplary embodiments. The pop-out camera module may further include a magnetic conduction shielding layer 27, and the magnetic conduction shielding layer 27 is disposed between the n coils 22 and the camera housing 21.

In the embodiments of the present disclosure, the magnetic field intensity of the electromagnetic field generated by the coils after being energized can be improved and the interference on the work of the camera is reduced by disposing the magnetic conduction shielding layer on the inner ring of the coils.

Referring back to FIG. 1, the pop-out camera module may further include a power supply circuit 28 coupled with the n coils 22. The power supply circuit 28 is a flexible circuit. The power supply circuit 28 is used to supply power to the n coils 22. In addition, the power supply circuit 28 can also supply power to the camera.

The pop-out camera module provided by the embodiments of the present disclosure realizes pop-out and pop-back operations through interaction between the coils after being energized and the magnets. As compared with the related art in which the pop-out camera module realizes pop-out and pop-back by using mechanical devices such as a motor, a gear set, a lead screw, etc., embodiments of the present disclosure can reduce the structure complexity of the pop-out camera module, and save the occupied space.

In addition, in embodiments of the present disclosure, the limit slot is adapted to the limit portion. On the one hand, the limit portion can slide in the limit slot during the pop-out or pop-back of the camera housing; on the other hand, due to the limitation of the length of the spacing slot, the maximum displacement of the camera housing is limited, and the camera housing is prevented from being detached from the module housing.

Further, in embodiments of the present disclosure, the magnets and the camera housing are separated by the baffles. On one hand, the damage to the magnets caused by friction generated during the pop-out and pop-back of the camera housing is avoided, and on the other hand, good lubricity is provided for the pop-out and pop-back of the camera housing.

Furthermore, in embodiments of the present disclosure, the magnetic field intensity of the electromagnetic field generated by the coils after being energized can be improved and the interference on the work of the camera is reduced by disposing the magnetic conduction shielding layer on the inner ring of the coils.

Figure 6:
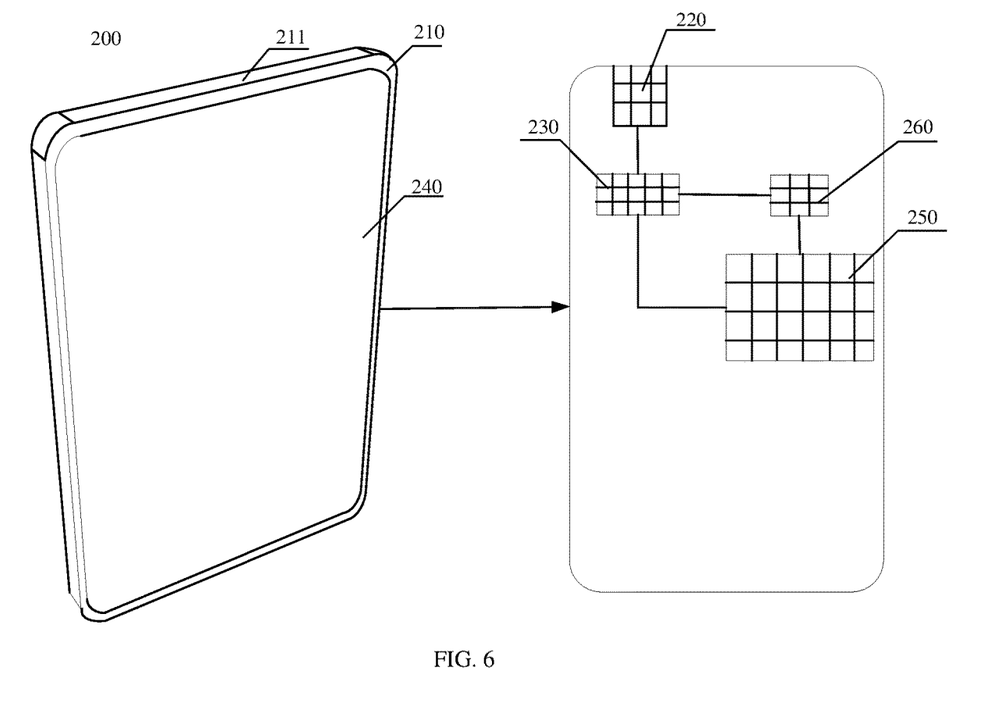
FIG. 6 is a schematic diagram of a terminal according to an exemplary embodiment.
Figure 7:
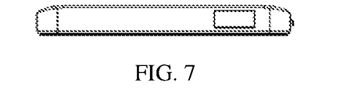
FIG. 7 schematically illustrates a top view of a terminal with a camera housing in a pop-out state, according to an exemplary embodiment.
Figure 8:
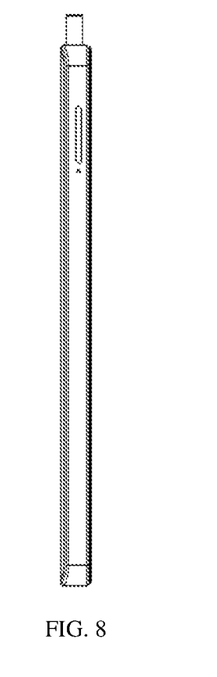
FIG. 8 schematically illustrates a left side view of the terminal with the camera housing in the pop-out state, according to an exemplary embodiment.
Figure 9:
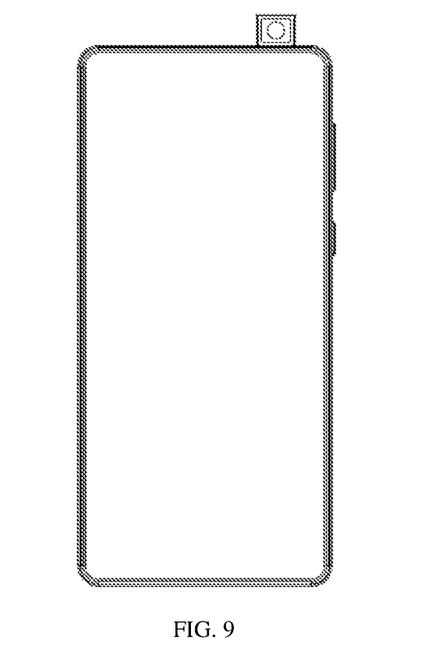
FIG. 9 schematically illustrates a front view of the terminal with the camera housing in the pop-out state, according to an exemplary embodiment.
Figure 10:
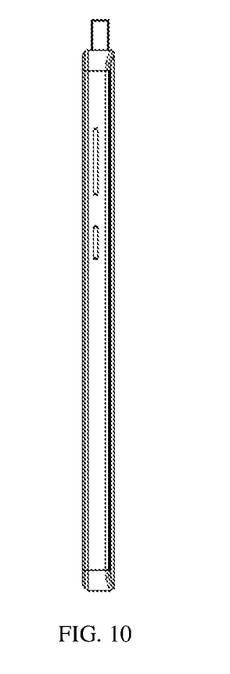
FIG. 10 schematically illustrates a right side view of the terminal with the camera housing in the pop-out state, according to an exemplary embodiment.
Figure 11:
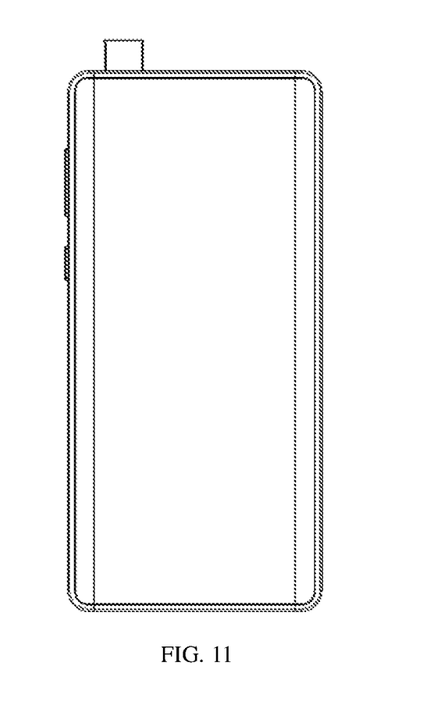
FIG. 11 schematically illustrates a rear view of the terminal with the camera housing in the pop-out state, according to an exemplary embodiment.
Figure 12:
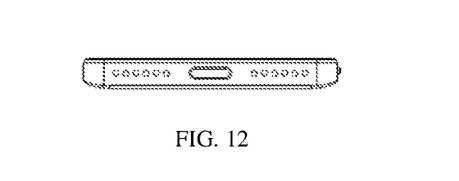
FIG. 12 schematically illustrates a bottom view of the terminal with the camera housing in the pop-out state, according to an exemplary embodiment.

FIG. 6 shows a schematic diagram of a terminal 200 according to an exemplary embodiment of the present disclosure. The terminal can be a smart phone, a tablet computer, an e-book reader, a game console, a wearable device, a medical device, etc.

The terminal 200 includes a body housing 210, a pop-out camera module 220 and a current control component 230 corresponding to the pop-out camera module 220. For example, the current control component 230 may be a circuit or a chip controlled by a processor to output a current signal to make the camera module pop out.

The body housing 210 is a body frame of the terminal 200. The body housing 210 may be hexahedron in shape, and some of the edges or corners of the hexahedron may be formed with curved chamfers. A front face of the body housing 210 may be rounded rectangular or right angle rectangular. The body housing 210 may include a middle frame 211, which is a frame around the body housing 210.

Figure 13:
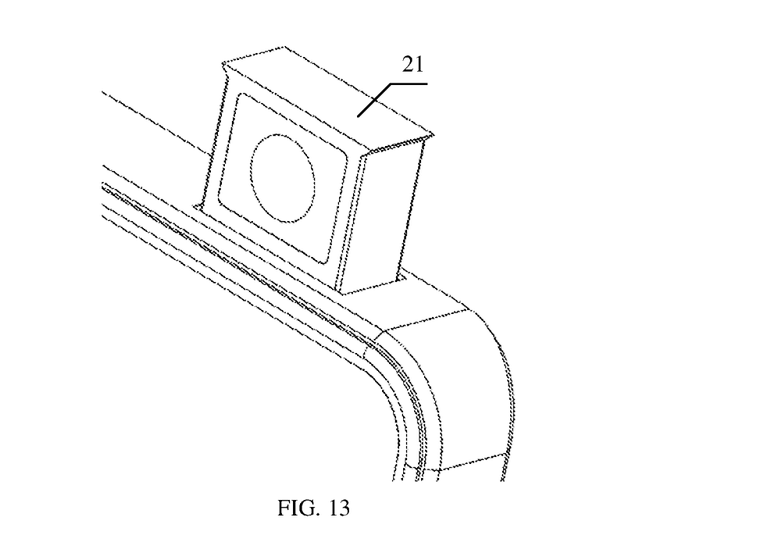
FIG. 13 schematically illustrates a partial front view of the camera housing in the pop-out state, according to an exemplary embodiment.
Figure 14:
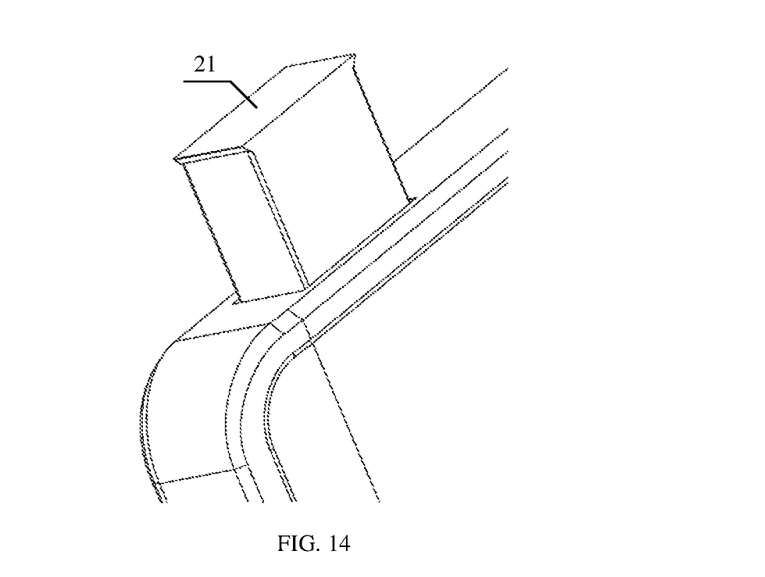
FIG. 14 schematically illustrates a partial rear view of the camera housing in the pop-out state, according to an exemplary embodiment.
Figure 15:
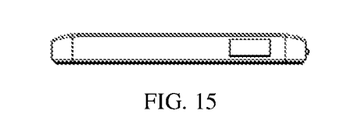
FIG. 15 schematically illustrates a top view of a terminal with a camera housing in a pop-back state, according to an exemplary embodiment.
Figure 16:
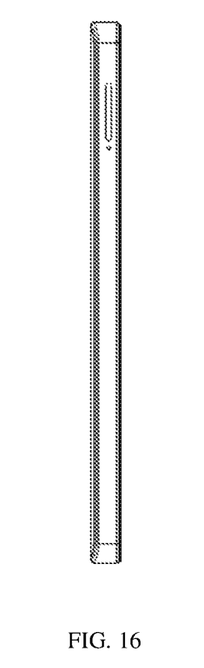
FIG. 16 schematically illustrates a left side view of the terminal with the camera housing in the pop-back state, according to an exemplary embodiment.
Figure 17:
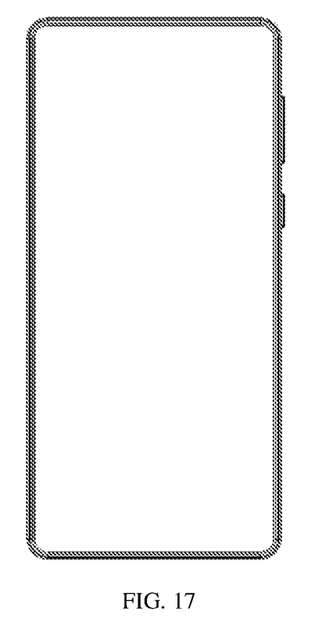
FIG. 17 schematically illustrates a front view of the terminal with the camera housing in the pop-back state, according to an exemplary embodiment.
Figure 18:
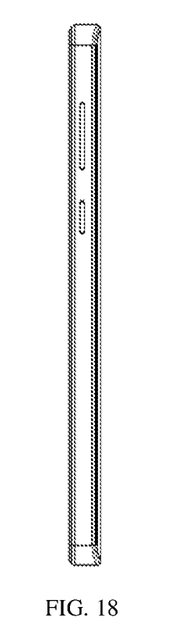
FIG. 18 schematically illustrates a right side view of the terminal with the camera housing in the pop-back state, according to an exemplary embodiment.
Figure 19:
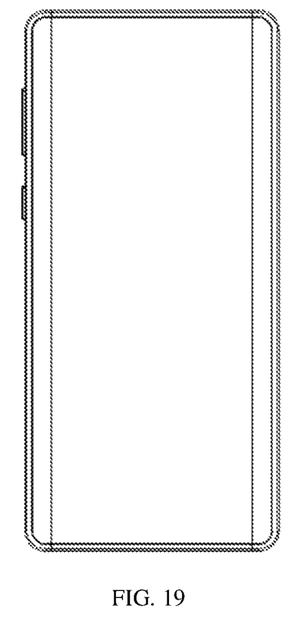
FIG. 19 schematically illustrates a rear view of the terminal with the camera housing in the pop-back state, according to an exemplary embodiment.
Figure 20:
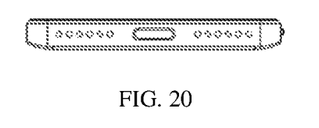
FIG. 20 schematically illustrates a bottom view of the terminal with the camera housing in the pop-back state, according to an exemplary embodiment.

The pop-out camera module 220 includes a module housing 10, a camera, a camera housing 21, n coils 22, a first magnet 23 and a second magnet 24, where n is an integer larger than 1, as described above in connection with FIG. 1. When a camera, such as a front camera, is needed to be used, the camera housing 21 in the pop-out camera module 220 is in a pop-out state and is exposed outside the terminal, so that the camera in the camera. housing 21 can take photographs or videos. FIGS. 7 to 12 show six views of the terminal in which the camera housing is in the pop-out state. The six views include a top view, a left view, a front view, a right view, a rear view and a bottom view. In addition, referring to FIGS. 13 and 14, a partial front view and a partial rear view of the camera housing 21 in the pop-out state are exemplarily shown. When the front camera is not needed to be used, the camera housing 21 is in a pop-back state and is hidden inside the terminal, so that the camera in the camera housing 21 is protected. Referring to FIGS. 15 to 20, six views of the terminal in which the camera housing is in the pop-back state are exemplarily shown. The six views include a top view, a left view, a front view, a right view, a rear view and a bottom view.

Figure 21:
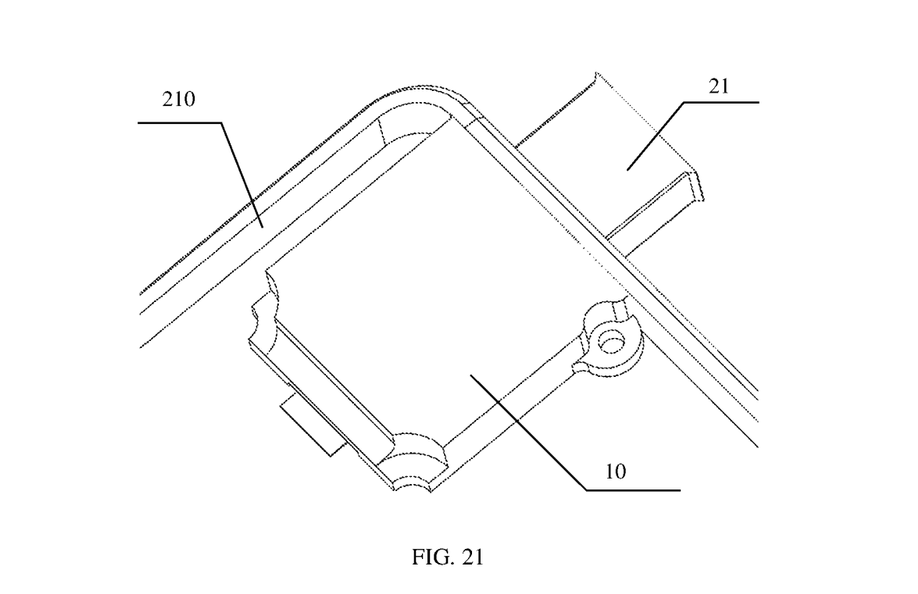
FIG. 21 schematically illustrates a schematic view of an internal structure of a terminal, according to an exemplary embodiment.

FIG. 21 is a schematic diagram showing an internal structure of a terminal. The module housing 10 of the pop-out camera module 220 (FIG. 6) is fixed on the body housing 210, and forms a receiving cavity with the body housing 210, and the camera housing 21 is located in the receiving cavity.

In exemplary embodiments, the module housing 10 can be fixed to the body housing 210 by screwing, welding, gluing, etc.

Referring to FIGS. 1 and 6, the current control component 230 is coupled with the n coils 22 of the pop-out camera module 220 through a power supply circuit, so that the current input into each coil can be controlled individually to generate an electromagnetic field combination, and interacts with the magnetic field of the magnets so as to further control the pop-out and pop-back of the camera housing 21.

Still referring to FIG. 6, the terminal 200 may further include a display screen 240. The display screen 240 is used to show images and colors. The display screen 240 may be a touch display screen, and the touch display screen has a function of receiving a touch operation (such as click, slide, press or other operations) of a user in addition to a display function. In addition, the display screen 240 may be an organic light-emitting diode (OLED) screen.

The terminal 200 may further include a processing component 250. The processing component 250 is a central control system of the terminal 200, and a control center of the logic part. The processing component 250 achieves the purpose of controlling the terminal 200 by running software in a memory and invoking a database in the memory. The processing component 250 may be a central processing unit (CPU) or a micro control unit (MCU).

It should be noted that the current control component 230 may be integrated on the processing component 250, or may exist independently of the processing component 250 and be coupled with the processing component 250.

In addition, the terminal 200 may further include a power supply 260. The power supply 260 provides power to the parts of the terminal 200. In the embodiment of the present disclosure, the power supply 260 may be coupled with the current control component 230 and the processing component 250, respectively, to provide power to the current control component 230 and the processing component 250.

The terminal provided by the embodiments of the present disclosure includes the pop-out camera module which is controlled by the current control component to realize the pop-out and pop-back of the camera housing. As compared with the related art in which the pop-out and pop-back are realized through mechanical devices such as a motor, a gear set and a lead screw and the like, embodiments of the present disclosure can reduce complexity of the structure of the pop-out camera module and save the occupied space.

Below, the pop-out and pop-back of the camera. housing 21 in the pop-out camera module 220 of the terminal 200 will be described in detail. In the embodiment described below, the current control component 230 and the processing component 250 are disposed in the terminal 200 independently of each other.

Figure 22:
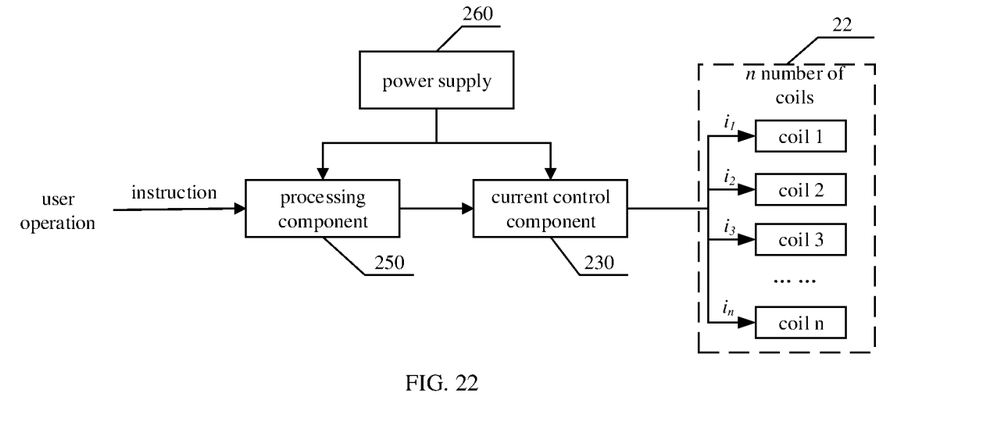
FIG. 22 is a schematic diagram illustrating pop-out and pop-back of a camera housing, according to an exemplary embodiment.

FIG. 22 is a schematic diagram showing pop-out and pop-back of the camera housing 21.

The processing component 250 in the terminal 200 receives an instruction triggered by an operation of a user acting on the terminal 200, and the instruction may be a camera pop-out instruction or a camera pop-back instruction. The processing component 250 sends the instruction to the current control component 230, and further, the current control component 230 controls the current flowing in each of the n coils 22 of the camera housing by the power supply circuit, so as to control the pop-out or pop-back of the camera housing 21. The power supply 260 provides power to the current control component 230 and the processing component 250.

Next, the pop-out and the pop-back of the camera housing 21 controlled by the current control component 230 will be described, respectively.

During the pop-out of the camera housing 21, the current control component 230 is used to receive a camera pop-out instruction, and control the power supply circuit to provide a first current to the n coils 22 according to the camera pop-out instruction, so that the n coils 22 generate the first electromagnetic field combination.

The camera pop-out instruction is an instruction for instructing the current control component 230 to provide the first current to the n coils 22. The camera pop-out instruction may be triggered by running a photographing application, and the terminal may invoke the camera through the photographing application. The photographing application may be a photographing application provided by the operating system itself, or may be a photographing application provided by a third party, which is not limited in embodiments of the present disclosure. The photographing application provided by the third party may be carried by an operating system and may be installed when the operating system is installed, or the photographing application may be downloaded and installed by a user.

The user can operate the photographing application in the terminal by tapping an icon of the photographing application installed in the terminal. In addition, the user can also run the photographing application program by voice control, for example, a voice input "turn on the camera", and correspondingly, the terminal runs the photographing application program after acquiring the voice. After the terminal runs the photographing application program, the camera can be invoked by the photographing application program to take photographs or videos.

In addition, the photographing application can be operated through a physical key or a touch key arranged on the terminal, or through voice, gesture triggering, etc. of a user, so as to trigger the camera pop-out instruction.

After receiving the camera pop-out instruction, the current control component knows that the camera housing 21 needs to be ejected currently, and the current control component controls the power supply circuit to provide the first current to the n coils 22. The first current may enable the n coils 22 to generate a first electromagnetic field combination. The first electromagnetic field combination includes a first electromagnetic field generated by the first coil group and a second electromagnetic field generated by the second coil group. The first electromagnetic field is an electromagnetic field that attracts the first magnet and the second magnet, and the second electromagnetic field is an electromagnetic field that repels the first magnet and the second magnet, so that the camera housing can be driven to pop-out.

During the pop-back of the camera housing 21, the current control component 230 is also used to receive a camera pop-back instruction, and control the power supply circuit to provide the second current to the n coils 22 according to the camera pop-back instruction, so that the n coils generate the second electromagnetic field combination.

Corresponding to the pop-out of the camera housing 21, the camera pop-back instruction is an instruction for instructing the current control component 230 to provide the second current to the n coils 22. The camera pop-back instruction may be triggered by turning off the photographing application.

After receiving the camera pop-back instruction, the current control component 230 knows that the camera housing 21 needs to be retracted currently, and the current control component controls the power supply circuit to provide a second current to the n coils 22. The second current can enable the n coils 22 to generate a second electromagnetic field combination. The second electromagnetic field combination includes a third electromagnetic field generated by the first coil group and a fourth electromagnetic field generated by the second coil group. The third electromagnetic field is an electromagnetic field that repels the first magnet 23 and the second magnet 24, and the fourth electromagnetic field is an electromagnetic field that attracts the first magnet 23 and the second magnet 24, so that the camera housing 21 can be driven to pop-back.

In some embodiments, the current control component 230 stores current change information, and the current change information is used to indicate changes of the current in each coil over time during pop-out and pop-back.

The current change information may be pre-stored in the current control component 230, and may be directly retrieved and used during the pop-out or the pop-back of the camera housing 21. The current change information may be a change profile of the current over time in one cycle (including the pop-out and the pop-back of the camera housing 21).

Figure 23:
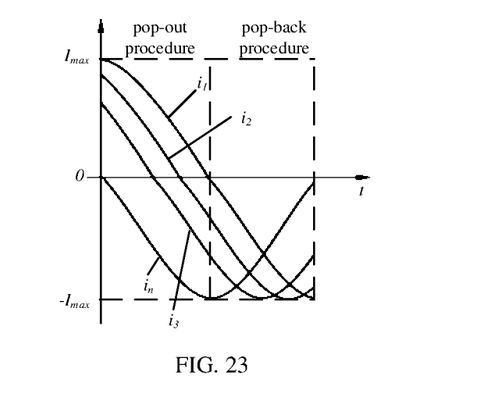
FIG. 23 is a schematic diagram of a current change profile, according to an exemplary embodiment.

FIG. 23 shows a schematic diagram of a current change profile according to an exemplary embodiment. The current change profile includes a current change profile for the pop-out and a current change profile for the pop-back.

In the embodiment, a curve $i_n$ represents the current change in the n-th coil. For example, a curve $i_1$ represents the current change in the first coil, a curve $i_2$ represents the current change in the second coil, a curve $i_3$ represents the current change in the third coil, and so on; $I_{max}$ represents the maximum value of the current over the entire period, $-I_{max}$ represents the maximum value of the reverse current over the entire period, and i represents time.

As can be seen from FIG. 23, the current change profile is similar to a sinusoidal curve because the polarities of the first magnet 23 and the second magnet 24 are mirrored, and thus a position where the magnetic field intensity is the weakest appears between the first magnet 23 and the second magnet 24, and the magnetic induction lines on both sides of the position are opposite. Thus, the current is the maximum at both ends (i.e., where the magnetic field intensity is largest) of the first magnet 23 and the second magnet 24, thereby improving the propulsion efficiency of the coils, reducing heat generation and reducing power consumption.

In embodiments of the present disclosure, the current change information of each coil in the n coils may be pre-stored in the current control component, and the current control component can directly retrieve and use the current change information to control the current in the n coils so as to further control the pop-out and pop-back of the camera housing. As compared with the related art in which the pop-out and pop-back are realized through mechanical devices such as a motor, a gear set and a lead screw and the like, embodiments of the present disclosure can improve the pop-out and pop-back efficiency of the camera housing and shorten the time required for pop-out and pop-back.

The above description is only exemplary embodiments of the present disclosure, and is not intended to limit the present disclosure, and any modifications, equivalents, improvements, etc., that are within the spirit and principle of the present disclosure should be to be included within the protection scope of the present disclosure.

What is claimed is:

1. A pop-out camera module, comprising:
   a module housing, a camera housing, a plurality of coils, a first magnet and a second magnet, wherein:
   a pop-out hole of the camera housing is formed on the module housing, and a camera is disposed inside an upper part of the camera housing;
   the plurality of coils are disposed in parallel and axially surround an outer wall below the camera housing; and
   the first magnet and the second magnet are disposed in the module housing, and the plurality of coils are located between the first magnet and the second magnet.

2. The pop-out camera module according to claim 1, wherein the first magnet and the second magnet are permanent magnets, and a polarity of an end of the first magnet close to the camera housing is the same as a polarity of an end of the second magnet close to the camera housing.

3. The pop-out camera module according to claim 1, wherein:
   during pop-out of the camera housing, the plurality of coils generate a first electromagnetic field combination to push the camera housing to pop out from the module housing under driving of the first magnet and the second magnet; and
   during pop-back of the camera housing, the plurality of coils generate a second electromagnetic field combination to pull the camera housing to pop back into the module housing under the driving of the first magnet and the second magnet.

4. The pop-out camera module according to claim 3, wherein the plurality of coils comprise a first coil group and a second coil group; and during the pop-out and the pop-back, the first coil group and the second coil group generate electromagnetic fields with opposite magnetism so as to drive the camera housing to pop out or pop back.

5. The pop-out camera module according to claim 1, wherein:

a limit slot is formed on the module housing;

a limit portion matching the limit slot is disposed on the camera housing; and during the pop-out or the pop-back, the limit portion of the camera housing slides in the limit slot.

6. The pop-out camera module according to claim 1, further comprising:

a first baffle and a second baffle;

wherein the first baffle is disposed between the first magnet and the camera housing; and the second baffle is disposed between the second magnet and the camera housing.

7. The pop-out camera module according to claim 1, further comprising:

a magnetic conduction shielding layer, wherein the magnetic conduction shielding layer is disposed between the plurality of coils and the camera housing.

8. The pop-out camera module according to claim 1, further comprising:

a power supply circuit coupled with the plurality of coils, wherein the power supply circuit is a flexible circuit.

9. A terminal, comprising:

a body housing;

a pop-out camera module; and a current control component corresponding to the pop-out camera module;

wherein the pop-out camera module comprises a module housing, a camera housing, a plurality of coils, a first magnet and a second magnet;

a pop-out hole of the camera housing is formed on the module housing, and a camera is disposed inside an upper part of the camera housing;

the plurality of coils are disposed in parallel and axially surround an outer wall the camera housing; and the first magnet and the second magnet are disposed in the module housing, and the plurality of coils are located between the first magnet and the second magnet; and wherein the current control component is coupled with the plurality of coils of the pop-out camera module through a power supply circuit.

10. The terminal according to claim 9, wherein the current control component is configured to:

receive a camera pop-out instruction, and control the power supply circuit to provide a first current for the plurality of coils according to the camera pop-out instruction, so that the plurality of coils generate a first electromagnetic field combination; and receive a camera pop-back instruction, and control the power supply circuit to provide a second current for the plurality of coils according to the camera pop-back instruction, so that the plurality of coils generate a second electromagnetic field combination.

11. The terminal according to claim 9, wherein current change information is stored in the current control component, and the current change information is configured to indicate a change of a current in each of the plurality of coils over time during pop-out and pop-back.

12. The terminal according to claim 9, wherein the first magnet and the second magnet are permanent magnets, and a polarity of an end of the first magnet close to the camera. housing is the same as a polarity of an end of the second magnet close to the camera housing.

13. The terminal according to claim 9, wherein:

during pop-out of the camera housing, the plurality of coils generate a first electromagnetic field combination to push the camera housing to pop out from the module housing wider driving of the first magnet and the second magnet; and during pop-back of the camera housing, the plurality of coils generate a second electromagnetic field combination to pull the camera housing to pop back into the module housing under the driving of the first magnet and the second magnet.

14. The terminal according to claim 9, wherein the plurality of coils comprise a first coil group and a second coil group; and during the pop-out and the pop-back, the first coil group and the second coil group generate electromagnetic fields with opposite magnetism so as to drive the camera housing to pop out or pop back.

15. The terminal according to claim 9, wherein:

a limit slot is formed on the module housing;

a limit portion matching the limit slot is disposed on the camera housing; and during the pop-out or the pop-back, the limit portion of the camera housing slides in the limit slot.

16. The terminal according to claim 9, wherein the pop-out camera module further comprises:

a first baffle and a second baffle;

wherein the first baffle is disposed between the first magnet and the camera housing; and the second baffle is disposed between the second magnet and the camera housing.

17. The terminal according to claim 9, wherein the pop-out camera module further comprises:

a magnetic conduction shielding layer, wherein the magnetic conduction shielding layer is disposed between the plurality of coils and the camera housing.

18. The terminal according to claim 9, wherein the pop-out camera module further comprises:

a power supply circuit coupled with the plurality of coils, wherein the power supply circuit is a flexible circuit.

* * * * *